Figure 19:
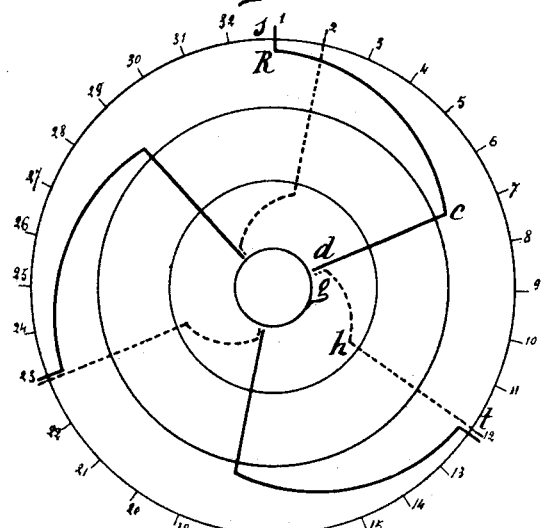
Figure 20:
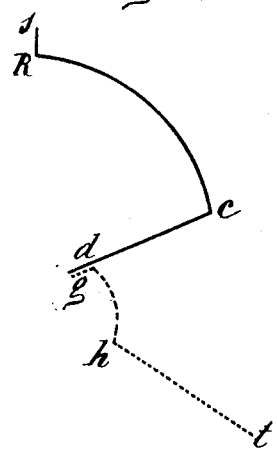

(No Model.)  12 Sheets—Sheet 1.
E. DESROZIERS.
DYNAMO ELECTRIC MACHINE.
No. 459,610.  Patented Sept. 15, 1891.
_Fig. 2_
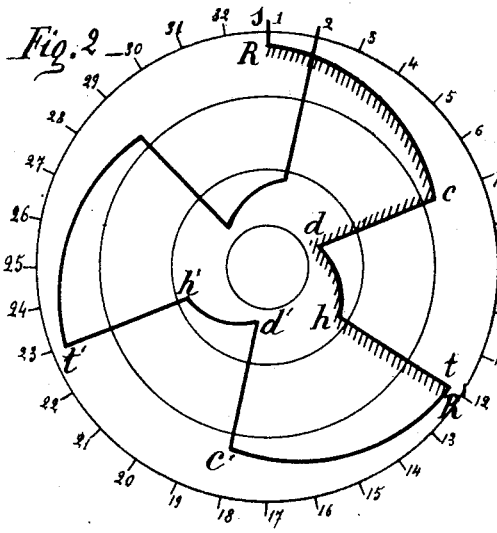
_Fig. 1_
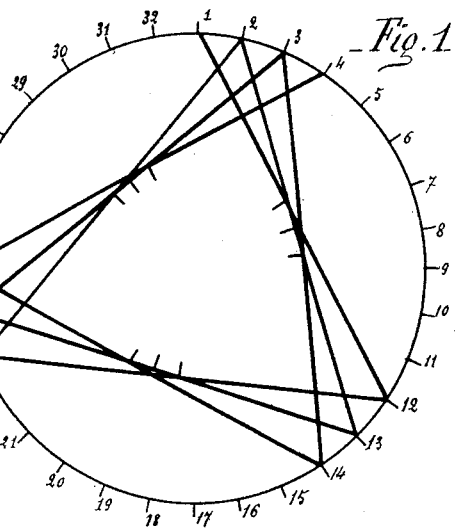
_Fig. 3_
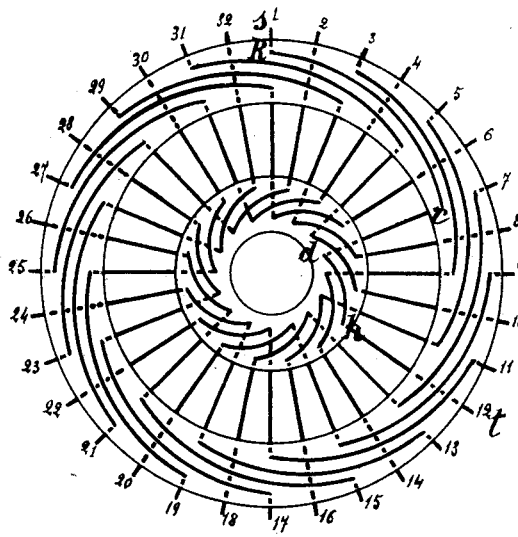
_Fig. 4_
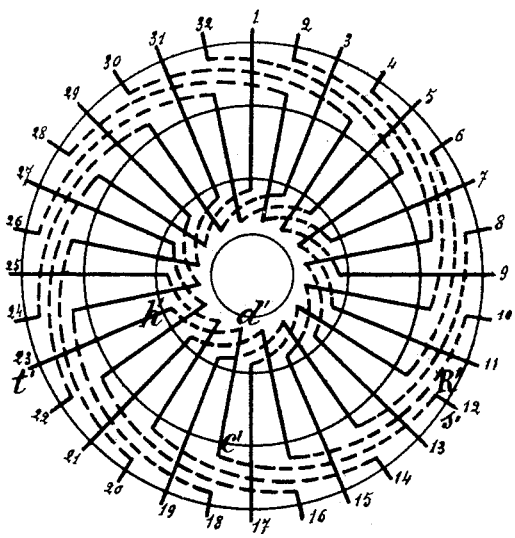
Witnesses:
E. W. Stuart
Mayro C. Goldman
Inventor:
Edmund Desroziers
By Henry Connett
Atty.

(No Model.) 12 Sheets—Sheet 2.
E. DESROZIERS.
DYNAMO ELECTRIC MACHINE.
No. 459,610. Patented Sept. 15, 1891.
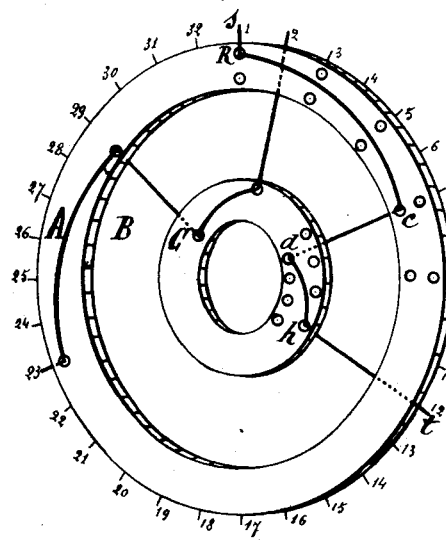
Fig. 5
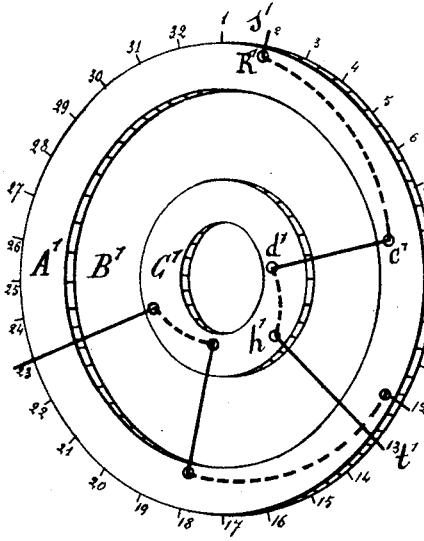
Fig. 6
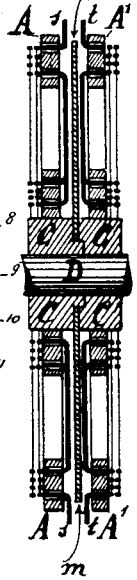
Fig. 7
Fig. 8
Fig. 9
Witnesses:
E. W. Stuart
Mayer Goldman
Inventor:
Edmond Desroziers
By Henry Connett
Atty.

(No Model.)  12 Sheets—Sheet 3.
E. DESROZIERS.
DYNAMO ELECTRIC MACHINE.
No. 459,610. Patented Sept. 15, 1891.
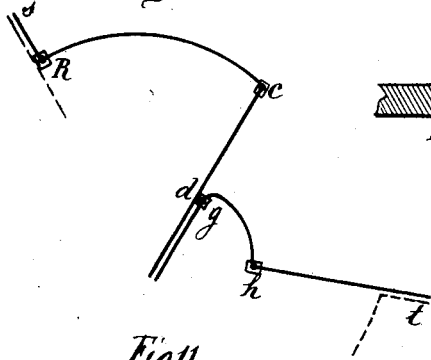
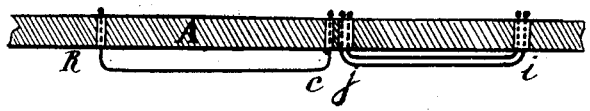
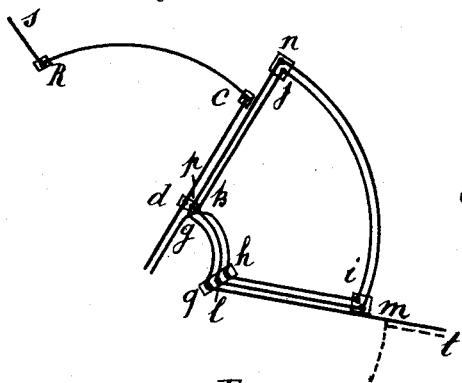
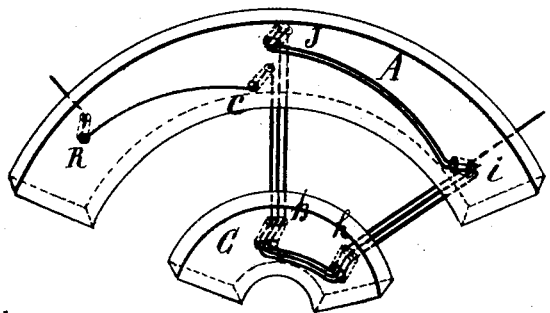
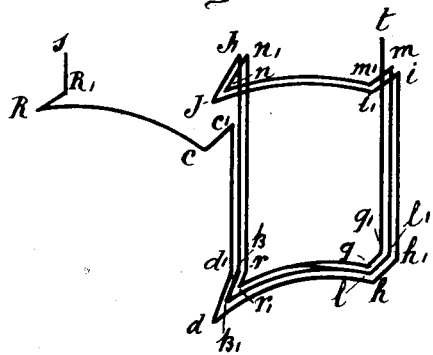
Witnesses:
E. W. Stuart
Mayro C. Goldman
Inventor:
Edmond Desroziers
By Henry Connett
Atty.

(No Model.) 12 Sheets—Sheet 4.
E. DESROZIERS.
DYNAMO ELECTRIC MACHINE.
No. 459,610. Patented Sept. 15, 1891.
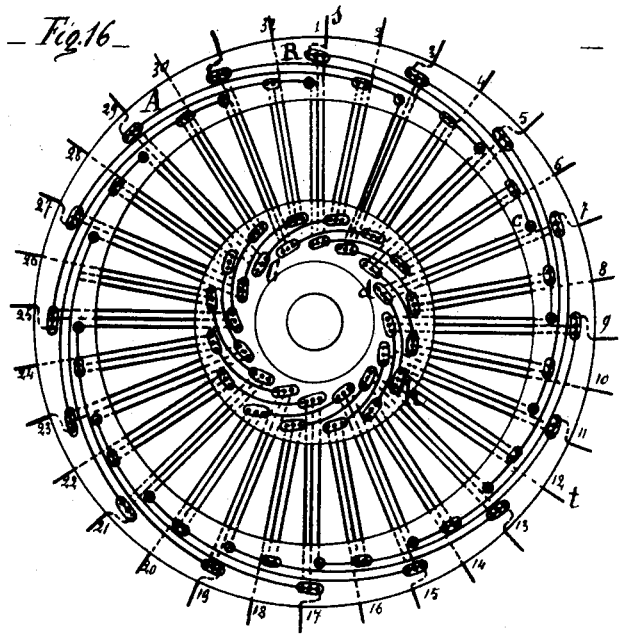
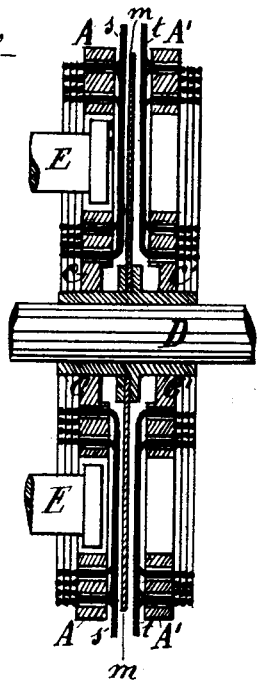
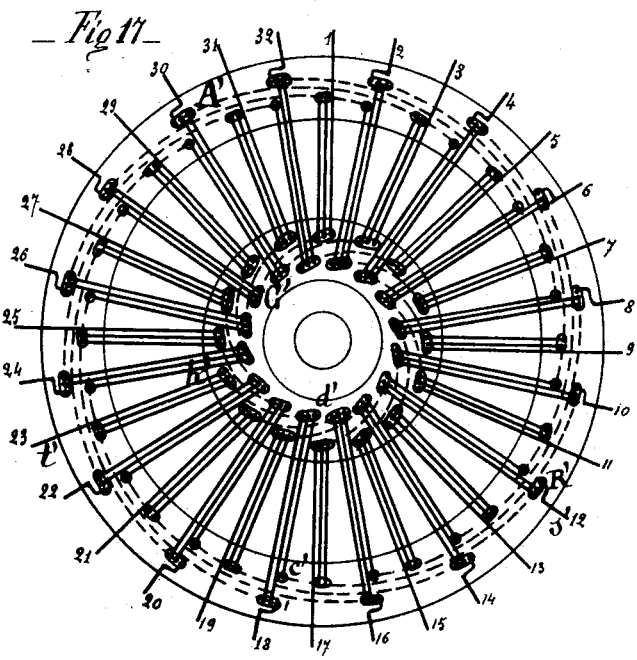
Witnesses:
Inventor:

(No Model.) 12 Sheets—Sheet 5.

E. DESROZIERS.
DYNAMO ELECTRIC MACHINE.

No. 459,610. Patented Sept. 15, 1891.

Witnesses:
E. W. Stuart
Mayro C. Goldman

Inventor:
Edmund Desroziers
By Henry Connett
Atty.

(No Model.) 12 Sheets—Sheet 6.
E. DESROZIERS.
DYNAMO ELECTRIC MACHINE.
No. 459,610. Patented Sept. 15, 1891.
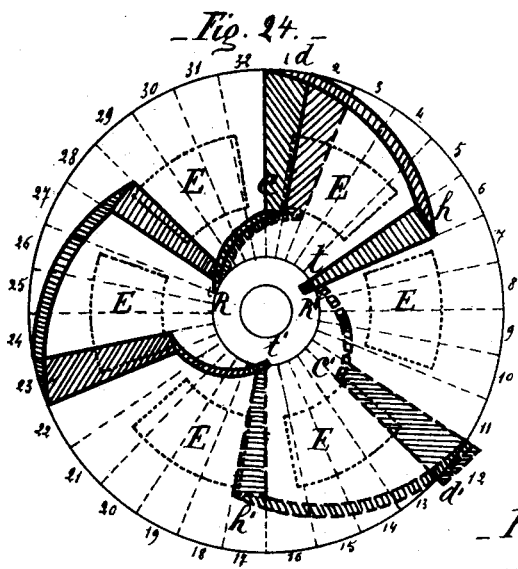
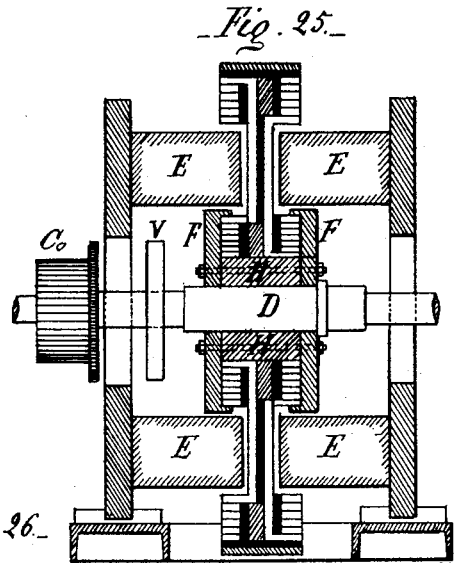
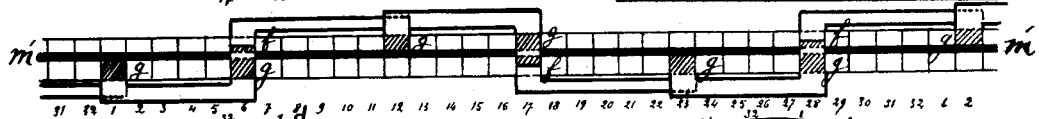
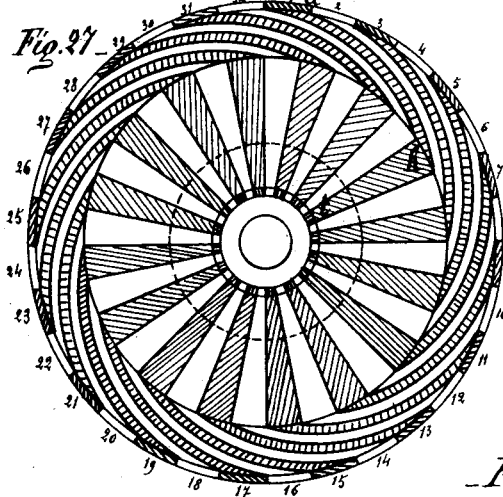
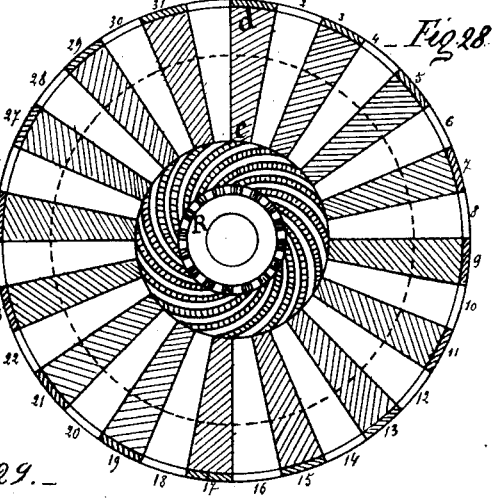
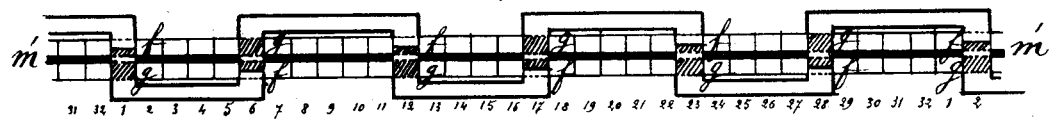
Witnesses:
Inventor:
Edmund Desroziers
By Henry Connett
Atty.

(No Model.) 12 Sheets—Sheet 7.

E. DESROZIERS.
DYNAMO ELECTRIC MACHINE.

No. 459,610. Patented Sept. 15, 1891.

Witnesses:
Inventor:
Edmund Desroziers
By Henry Connett
Atty.

(No Model.) 12 Sheets—Sheet 8.
E. DESROZIERS.
DYNAMO ELECTRIC MACHINE.
No. 459,610. Patented Sept. 15, 1891.
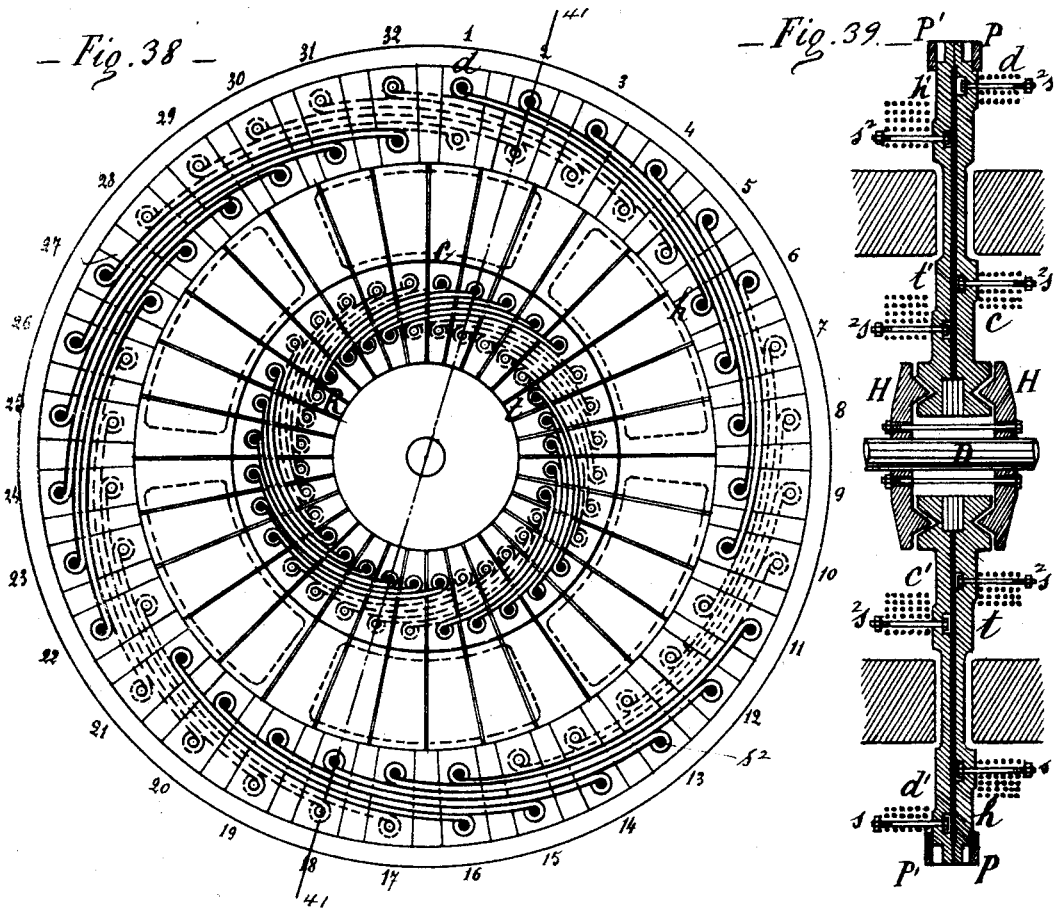
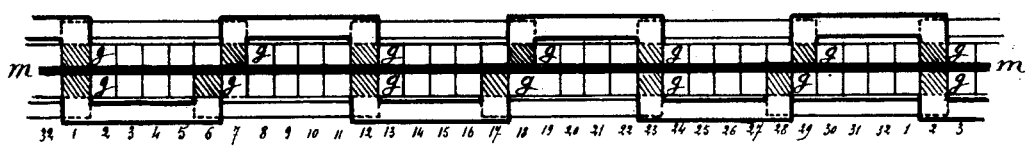
Witnesses:
E. W. Stuart
Mayro Goldman
Inventor:
Edmund Desroziers
By Henry Connett
Atty.

(No Model.) 12 Sheets—Sheet 9.
E. DESROZIERS.
DYNAMO ELECTRIC MACHINE.
No. 459,610. Patented Sept. 15, 1891.
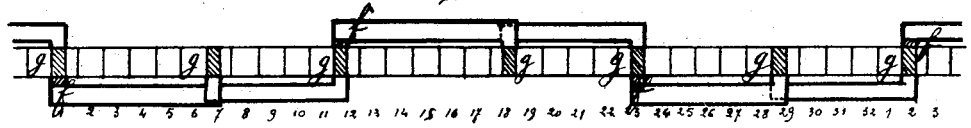
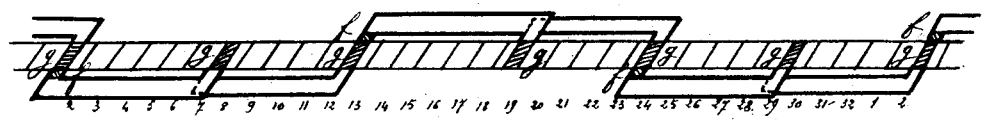
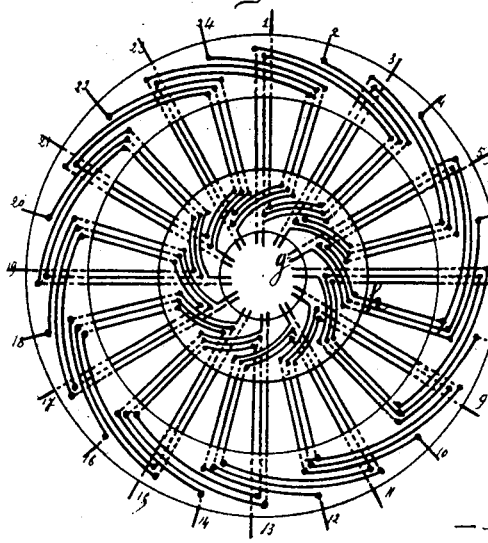
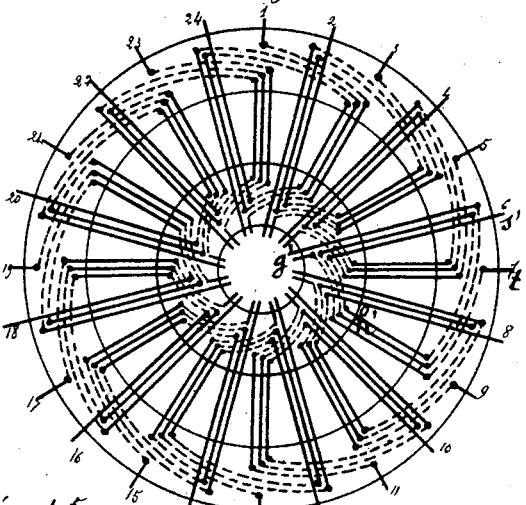
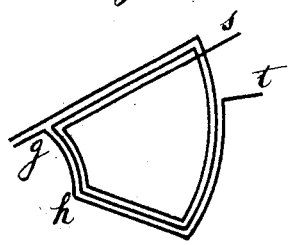
Witnesses:
Inventor:
Edmond Desroziers
By Henry Connett
Atty.

(No Model.)  12 Sheets—Sheet 10.

E. DESROZIERS.
DYNAMO ELECTRIC MACHINE.

No. 459,610.  Patented Sept. 15, 1891.

Witnesses:
E W Stuart
Mayer C Goldman

Inventor:
Edmond Desroziers
By Henry Connett
Atty.

(No Model.) 12 Sheets—Sheet 11.

E. DESROZIERS.
DYNAMO ELECTRIC MACHINE.

No. 459,610. Patented Sept. 15, 1891.

Witnesses:
E. W. Stuart
Mayro Goldman.

Inventor:
Edmund Desroziers
By Henry Connett
Atty.

(No Model.) 12 Sheets—Sheet 12.

E. DESROZIERS.
DYNAMO ELECTRIC MACHINE.

No. 459,610. Patented Sept. 15, 1891.

Witnesses:
E. W. Stuart
Mayer C. Goldman

Inventor:
Edmond Desroziers
By Henry Connett
Atty.

UNITED STATES PATENT OFFICE.

EDMOND DESROZIERS, OF PARIS, FRANCE.

DYNAMO-ELECTRIC MACHINE.

SPECIFICATION forming part of Letters Patent No. 459,610, dated September 15, 1891.

Application filed June 17, 1887. Serial No. 241,635. (No model.) Patented in France June 24, 1885, No. 169,746, and June 11, 1886, No. 176,718; in Belgium December 9, 1886, Nos. 75,548 and 75,549, and in England December 11, 1886, No. 16,273.

*To all whom it may concern:*

Be it known that I, EDMOND DESROZIERS, a citizen of the French Republic, and a resident of Paris, France, have invented certain new and useful Improvements in Electrical Machines, (for which I have been granted Letters Patent in France, No. 169.746, dated June 24, 1885, and No. 176,718, dated June 11, 1886; in Great Britain, No. 16,273, dated December 11, 1886, and in Belgium, Nos. 75,548 and 75,549, dated December 9, 1886,) of which the following is a specification.

The object of this invention is to produce an armature for multipolar dynamo-electric machines either of the disk or drum form.

The invention will be fully described hereinafter, and its novel features carefully defined in the claims.

In the drawings which serve to illustrate the invention, Figure 1 is a diagram illustrating the principles of the regular star-shaped polygonal winding of the disk armature, and Figs. 2, 3, and 4 are somewhat diagrammatic views illustrating the arrangement of the zigzag elements on the disk sectors, as will be hereinafter described. Figs. 5 and 6 are oblique projections illustrating the construction and mode of winding the two sections of the disk armature, and Fig. 7 is a diametrical section of said armature. Fig. 8 is a view of the zigzag element detached. Fig. 9 is a diagram showing the development of the armature. Figs. 10 to 18, inclusive, illustrate the compound zigzag winding according to my invention, as will be hereinafter explained. Figs. 19 to 23, inclusive, illustrate a modified form of the simple zigzag winding. Figs. 24 to 29, inclusive, illustrate the zigzag winding when flat material, as sheet metal, is used in the elements. Figs. 31 to 37, inclusive, illustrate another form of winding, which will be hereinafter described. Figs. 38 to 42 illustrate another form of winding, which will be hereinafter described. Figs. 43 to 51 illustrate my invention as applied to a disk armature which has no magnetic material and wherein the winding is of the kind called "ordinary polygon." Fig. 52 illustrates my invention applied to a disk armature having in it magnetic material. Figs. 53 to 59, inclusive, illustrate the application of my invention to a drum armature.

I will first explain the construction of the disk form of armature with reference to the accompanying drawings. Take a disk Fig. 1 and submit each of its faces to the action of six like inductors equally excited and alternatively with contrary names and mounted symmetrically on a circular crown. These two series of inductors are placed so as to face each other and are separated for a certain distance, the opposed poles being of contrary names. Trace on this disk Fig. 1 thirty-two divisions forming the successive sectors 1 2 3, &c., to 32. Here $32 = 3 \times 11 - 1$. Form the polygonal star 1 12 23 2 13 24 3 14 25 4, &c. This polygonal star will close with the side 22 1. Place on each of the sides of this polygon, such as 1 12, a conductor abutting at the same extremities and having the form R*cdht*, Fig. 2, composed of two parts R*c* and *dh*, in involutes of the circle, and of two parts *cd* and *ht*, disposed radially. Under these conditions it can easily be seen that the electro-motive actions of the parts, such as *cd* and *ht*, habitually co-operate, depending on the arrangement of the field-magnet poles; second, the electro-motive actions of the successive parts *cd*, *ht*, and *c'd'h't'* are cumulative; third, the mass of conductors form a closed circuit composed of two equal parts having equal and opposed electro-motive actions.

As in the ordinary Gramme machines with two poles the successive groups, such as *cd ht*, are in effect in advance constantly the one of the other in the several corresponding parts of the magnetic flows produced by the inductors. Likewise, as in the Gramme machine, one may obtain a continuous current. It will suffice, for example, to employ a collector having ninety-six laminæ in thirty-two groups of three laminæ placed at angles of one hundred and twenty degrees from each other, and to connect each of these groups of three laminæ to one of the divisions—as, for instance, 1. Each of the thirty-two summits, such as 1, is thus connected to a group of three laminæ. The connected conductors will be advantageously fixed on a support, which I call a "connector" or "bearer of connections." By placing brushes either at sixty degrees from one another or at one hundred and eighty degrees from one another we collect the current when the disk is rotated between the inductors. This winding presents some very great practical difficulties and numberless inconveniences, resulting, principally, first, from the fact that these conductors, such as Rc or dh, cut at each instant the radial conductors, such as cd or ht; second, from the fact that these several conductors are superposed I avoid these inconveniences by dividing or classing the winding into two parts. The whole zigzags, such as Rchdt, can be divided into two categories, first, the whole zigzags Rcdht, which we will call the "odd" ones, because they correspond to the sides of the polygon, Fig. 1, beginning with an odd number, such as 1 3 5 7, &c.; second, the "even zigzag" R'c'd'h't', so called because they correspond to the sides of the polygon, Fig. 1, beginning with an even number 2 4 6, &c. Let us trace on Fig. 3 all the odd zigzags in their relative positions and in the same way on Fig. 4 all the even zigzags. In each of these figures none of the radial parts will cover each other, there being only one radial part in each sector 1 2 3 4 to 32 if the divisions of the ascending and descending parts are not of the same parity. This is the case in these figures, and the classification can always be made in a suitable way, as will be seen farther on by example—e. g., Fig. 24. Further, we see that all the zigzags of the same parity completely cover the surface of each circle of Figs. 3 and 4 without the radial parts covering each other and without the parts in the shape of involutes or evolvents, which are naturally parallel, covering each other. The only lines which cut each other are the parts in the shape of evolvents and the radial parts. If we place these two categories of lines in two different planes, these intersections of lines will be done away with. Figs. 3 and 4 show the displacement of parts such as Rc and dh and Rc' and d'h'. Fig. 3 answers to the case where the odd evolvents are in front of the odd circle and partly hide the radial lines. Fig. 4 answers to the case where the even evolvents are behind the even circle, and are consequently indicated by dotted lines.

In order to be continuous, each zigzag must be completed by small pieces serving to join the radial parts and the parts in the shape of evolvents thus separated, such as RR CC dd hh of Fig. 8, Plate 2. For instance, let us first apply this first grouping of the different parts of the tracing to an armature-winding made with wires. Let us take two thin disks of some suitable matter, Fig. 5, Plate 2, ABC and Fig. 6, A'B'C'. Each of these disks is composed of three crowns or rings A, then B, then C. In these figures the intermediary crown B is supposed to have been removed. We must suppose that, to begin with, this crown is in its place and that each disk forms a solid continuous whole. Let us make on the disk Fig. 5 the odd tracing and on the disk Fig. 6 the even tracing. At all the angles formed by the evolvents and the radial parts let us bore holes or form notches, which are thus distributed regularly over the whole circumference. They leave between them an appreciable quantity of matter. Let us take a wire suitable in dimension and quality. Let us lay it flatwise under the disk Fig. 5 in the radial direction from S to R. At R let us make it go through the disk by the corresponding hole. Then let us make it follow flatwise the curve Rc on and in front of the disk as far as c. At C let us make it traverse the disk. Let us lay it flatwise under and behind the disk along the radial line cd as far as d. At d let us make it traverse the disk and follow flatwise on and in front of the disk the curve dh as far as h. At h let us make it traverse the disk and lay it flatwise under and behind the disk along the radial line ht, which we prolong a little as far as the circumferential level of SR. The zigzag thus formed has in space the schematic form sR RR Rc cc cd dd dh hh ht of Fig. 8, Plate 2. The whole of the odd disk can thus be covered with these zigzags. In the same way the even disk Fig. 6 can be covered with analogous zigzags. The only difference between these two figures (5 and 6,) as seen in the drawings, is that we have placed in Fig. 6 the radial parts on and in front of the disk and the parts in the shape of evolvents under and behind the disk. Let us superpose the two disks after completing the winding in such a way that the divisions correspond—i. e., that 5 6 7, &c., of Fig. 5 come upon 5 6 7, &c., of Fig. 6. The different ends sR and t of each odd zigzag are naturally placed opposite corresponding ends t' and S'R' of the even zigzags, which precede and follow it. Let us join these ends together in any way whatsoever. We will then have a continuous closed winding. Let us take off the two intermediate crowns B and B' the radial parts will become visible and will form two layers of wires of slight thickness. As is seen in Fig. 7 in section, we have taken care to interpose between the two plates ABC and A' B' C' a thin core m m of some resisting matter and in the shape of a disk, which we will call the "supporting-disk." This disk is fixed on a stock which is mounted on a shaft D perpendicular to the plane of the winding-plates and whose axis passes through their center. The crowns A and A' are fixed by bolts on the star m m and crowns C and C' on the star or on the stock. This being so, when the crowns B and B' are removed the whole forms a solid mass. The wires, such as cd and ht, are powerfully shouldered on the crowns A and A' and B and B' by the manner of winding. The strains transmitted by the wires to the crowns are easily borne by the disk on the stock.

Fig. 9, Plate 2, represents in schema the arrangement of the winding of Figs. 5, 6, and 7. In order to understand this figure thoroughly, we must suppose it to be a kind of schematic section made by a cylinder parallel to the shaft D and at equal distance from the crowns A A' and C C'. This section has been developed and put straight, and the conductors have been traced square to simplify the drawings. The reader who fails to grasp this schema thus presented under the form of a schematic section must suppose that the intention is to represent a view of the winding, supposing that the eye placed at a great distance were to be directed constantly toward the center of the disk and were to be shifted in succession from sector 1 to sector 2, then 3, &c., and were finally to arrive at sector 32. In this figure, $m\,m$ is the trace of the disk. We see clearly that each odd zigzag 1 7 12 entirely on one side of the disk is followed by an even sector 12 18 23 entirely on the other side of the disk and so on. The different junctions of these zigzags are made in the case of this figure above the disk. These junctions are marked by little rectangles $f$, associated with the whole squares $g$, which represent the radial parts. We see, further, some examples where the junctions are made, by preference, on the interior circumference in place of making them, as in the two cases already presented, on the exterior circumference. The winding such as has just been described, Plates 1 and 2, we call "simple zigzag winding." Another winding is derived directly from it. We call it in contradistinction the "compound zigzag winding." This winding is indicated in Plates 4, Figs. 11, 12, 13, 14, and 15. In the case of the simple zigzag winding the tracing which takes in schema of the side of the star-shaped polygon is represented, Fig. 10, by SR$cdht$. At $dg$ is represented a separation which allows the winding to be put in contact with suitable laminæ of the collector and the current to be led to the brushes. In the case of the compound zigzag winding, the schematic tracing which takes the place of the side of the star-shaped polygon is represented, Fig. 11, by SR$cdgh$ $ijklmnpqt$.

Let us suppose the case of the odd disk. This tracing shows that, starting from the hole R, the wire, instead of following the curve R$c$ on the disk, then the radial line $cd$ under the disk to rejoin the even zigzag by $dh$, then $ht$, on the contrary comes back, starting from the notch $im$ on the disk, follows the curve $ij$ as far as $j$, then passes under the disk, following the radial line $jk$, ascends again onto the disk, follows the curve $kl$, then passes under the disk, follows the radial part $lm$ as far as the notch $im$, comes back to the disk, follows the curve $mn$ either on $ij$ or by the side of $ij$ as far as $n$, then passes under the disk, follows the radial part $np$ as far as $p$, comes back to the disk, follows for a third time the curve $pq$ as far as $q$, passes under the disk, follows the radial part $qt$, and finally comes out to join itself at $t$ to the following even zigzag. The tracing on the even disk would be analogous. The whole of a compound zigzag has thus the practical shape indicated in Fig. 12, where we see clearly the little joining-pieces, such as $cc'$, JJ', $qq'$, &c. These little joining-pieces connect the radial parts which are under the disk to the parts in the shape of evolvents which are on the disk. We thus have kinds of plates with raised edges alternatively on the odd disk and then on the even disk and joined together by the large joining-pieces, such as R$c$.

The practical winding of a compound zigzag is figured in perspective, Fig. 14, and in section, Figs. 13 and 15, for a fraction of the disk only. In Fig. 14, A and C are the crowns, R$c$ the large joining-pieces, and J$k$ and $hi$ the radial parts. Fig. 13 represents the circumferential section developed at the level of the exterior crown A. R$c$ and $ij$ are the joining-pieces. Fig. 15 represents the circumferential section developed at the level of the interior crowns C. $dh$ are the joining-pieces. In these figures we have supposed the joining-wires, such as $mn$ and $ij$, Fig. 11, to be superposed on each other. One more remark must be made. Figs. 11 and 12 are not identical. Fig. 12 refers to the case where the winding of the multiplier-spirals has to be made in practice in the direction of the movement of the hands of a watch in commencing with the lower end $t$ and ending by the outer ends, and where the compound zigzag is not united to a lamina of the collector by a cutting, such as $dg$, Fig. 10. Fig. 11, on the contrary, relates to the case where the winding of the multiplier-spirals has to be made in the opposite direction to that of the hands of a watch and where the compound zigzag is united at $dg$ to a suitable laminæ of the collector. It is evident that the cakes, such as J$khi$, Fig. 14, may have several layers and only one joining-piece R$c$. With this compound zigzag winding the odd disk, when wound, takes the shape of Fig. 16, Plate 5, in the case of three multiplier-spirals and one single layer. In the same way the even disk takes the shape of Fig. 17, Plate 5. It must be borne in mind that the radial wires are under the odd disk and on the even disk. When the odd disk is placed on the even disk, the section of the whole is represented. (Fig. 18, Plate 5.) We see clearly the disk-shaped support $mm$, fixed on the stock, which is wedged on the shaft. In the three figures 16, 17, and 18 the intermedial crowns are supposed to have been taken off. At A and A' are the exterior crowns and at C C' are the interior crowns. We see in this section the indication of two electros E in their regular position on one side of the armature. On the other side the electros in opposition are not shown. The preceding explanations are based on the grouping of the different parts of the tracing of the winding in odd zigzags and even zigzags. Now this grouping of the different parts of the tracing can be done in several different ways. Let us begin by the second grouping. Let Fig. 19, Plate 6, be the polygonal tracing already dealt with. We see at once, Fig. 20, that each zigzag R*cdht* may be divided into two parts, such as R*cd* and *ght*, and that these parts, Fig. 19, follow each alternatively. To adopt the same kind of explanation as those already given, we will this time call the first parts of each zigzag the "odd elements" and the second part the even elements. It is evident, as before, that all these even elements can be placed on a disk ABC, Fig. 21, which we will call "odd," and all the even elements on a disk A'B'C', Fig. 22, which we will call "even." This arrangement is somewhat different from the former one. Let us imagine again, for instance, that this is a case in which wires are exclusively employed. The winding-wire is always placed for the radial parts under the odd disk Fig. 21 and on the even disk Fig. 22, and the parts in the shape of evolvents on the odd disk Fig. 21 under the even disk Fig. 22. We have left the full lines because in reality the evolvents and the radial parts do not interfere with each other and do not cut each other. Let us superpose the two disks after having turned them in a proper direction, placing between them, as before, a disk-shaped support *mm*, serving to consolidate them, and let us join together above and through this supporting-disk the various ends of the wires, which come naturally to present themselves opposite each other. As formerly, the continuous and closed winding of the armature is constituted. We have only then to take off the intermediate crowns, such as B and B', to set up the armature, the connector, and the collector on a shaft D, as hereinbefore, &c., in order to have the induced part completely constituted. We can represent this arrangement by Fig. 23, which is a kind of section in schema by the cylinder at an equal distance from A and C, developed, as we have already explained in the case of Fig. 9 hereinbefore.

Figure 21:
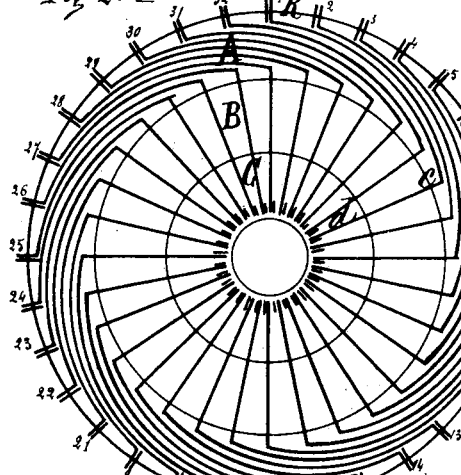
Figure 22:
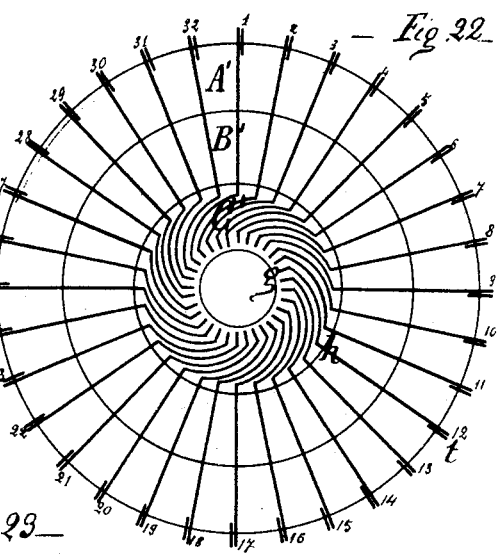
Figure 23:
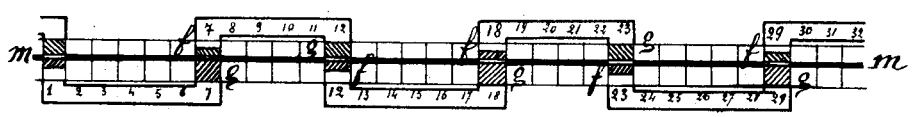

To simplify the drawings, we have also given rectangular shapes to various portions of the drawings. It will be seen that Fig. 23 is very different from Fig. 9. The odd and even elements have each time only one radial part and one joining-piece on each side of the star. The junction of each element to the following one is made by little rectangles *f*, associated to the square parts *g*, which represent the radial parts. All this winding, Figs. 21 and 22, is made flatwise on disks, such as ABC, as is also that in Figs. 3 and 4, Plate 1. Nevertheless to distinguish it from the first one we will call it the "oblique" or "imbricated" winding. We can also make a third kind of grouping. Instead of grouping the tracing in odd and even elements constituted by fragments of elementary zigzags, we can inversely group the tracing in successive elements alternatively identical or analogous, formed of groups of elementary zigzags in succession. Each group is entirely on one same side of the star on one same disk and the following group is on the other disk on the other side of this star. An instance of this grouping will be given afterwards, Figs. 38 and 39, Plate 9, in the case where the laminæ are employed for the winding. These preliminary observations having been made, let us apply this construction to the case of laminæ. We have said that in the case where the winding is made with wires the lack of stiffness in the wires renders it necessary to make use of crowns AC, on which the wires are solidly shouldered, and of the star-shaped supports *mm* to strengthen the whole and fix the crowns on the shaft. With the laminæ, which may be very stiff, there are numerous modifications in construction and winding. Figs. 24, 25, and 26 on Sheet 7 are these disk armatures armed with simple zigzags of laminated form R*cdht*, (Fig. 24 of the first mode of classification,) and corresponding to Figs. 5, 6, 7, 8, and 9, Sheet 2, of a disk armed with wires, and they have corresponding or like reference-letters. There are no longer any crowns or stars. A part II, furnished with a counter-plate F, is fixed to the central part of the disk, and an exterior circle serves to prevent the opening of the disk. It may be noted that the radial bars of the zigzag, alternatively odd and even, are in this case 1 and 6 instead of 7 and 12, as in the case of the wires. The junctions of the zigzags are made at R and *t*, Fig. 24, at the interior circumference. This may always be done.

Figure 31:
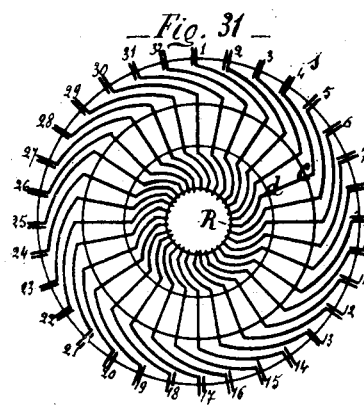
Figure 30:
Figure 32:
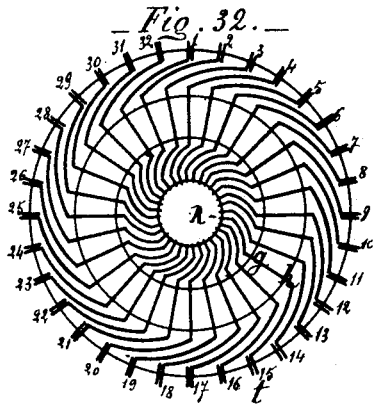
Figure 33:
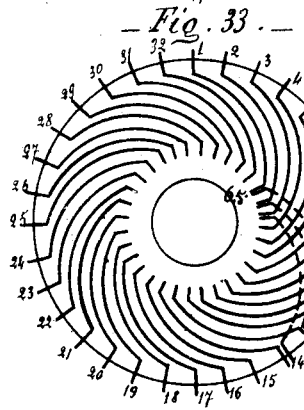
Figure 34:
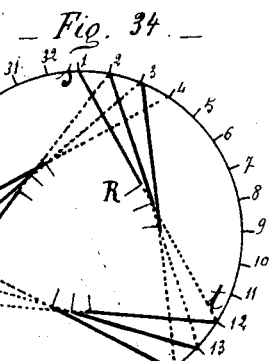
Figure 35:
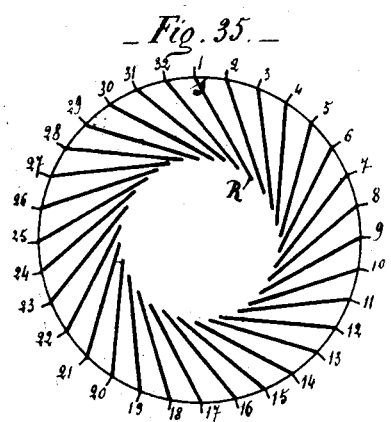
Figure 37:
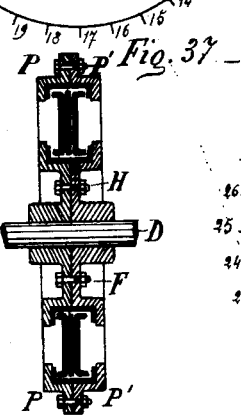
Figure 36:
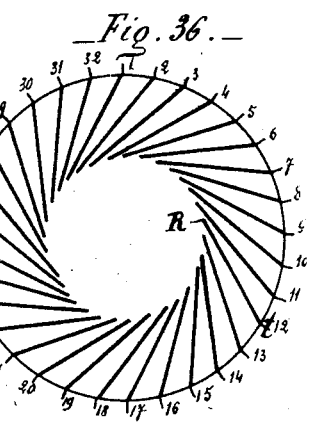

Figs. 27, 28, and 29, Sheet 7, are views showing a disk armature armed with laminæ in simple demi-zigzags of the second class, and corresponding to Figs. 21, 22, and 23 of Sheet 6 of a disk armed with wire. The same letters of reference are used to designate the parts. In these figures the involutes, instead of being outside of the plane of the disk, are let into the face thereof, since, as has been said, the radial parts and involutes are not incommoded or in the way of each other. In fact, and in a general way, the zigzag may take or have various forms. As examples: Figs. 30, 31, and 32, Sheet 8, represent a case where the involutes, such as R*c* and *dh* of the preceding figures are replaced by two evolvents, one to the left and the other to the right. Figs. 34, 35, 36, and 37 relate to a case where the radial parts are inclined and where in place of involutes we employ straight pieces having like inclinations. It is a very particular case where the tracing of the winding reduces itself to the form of a polygonal star. In this case it is evident that we may replace the bars SR and R*t* in alignment by two slightly-inclined bars, one on the other. Fig. 33 relates, on the contrary, to a case where the radial parts are involutes in alignment with involutes such as R*c* and *dh* of Fig. 2. These forms may be varied infinitely. We come now to the third classification of these different parts of the tracing.

This third grouping refers to the case in which, instead of taking a fraction of the elementary zigzag, we take in succession the groups of the elementary zigzag.

Figs. 38 and 39, Sheet 9, refer to the case in which we take as many as possible of the zigzags in succession one after another. These figures show at the same time a method of constructing and consolidating the disk somewhat different from those shown in the preceding figures. Following the winding we see that the evolvents in front of the disk are in juxtaposition in succesive series and marked in full lines and that the evolvents behind are in juxtaposition also in successive series, except some at the passage from one plate to the other. At these places the bolts S traverse the opposite radial laminæ by holes suitably insulated. If we make the section by the cylinder equidistant from the inner and outer involutes, and if we develop it schematically, as has been said before for Fig. 9, we obtain the tracing of Fig. 40. The various successive zigzags 1 6 12 17 23 28, &c., are in front. The successive zigzags 1 7 12 18 23 29, &c., are behind. These two categories of zigzags only join at a very small number of points. It is of course understood that the evolvents, instead of being formed of wires in juxtaposition, may be laminæ. These laminæ may be prolongations of the radial parts instead of being mounted on bolts S. In a general way, however, the radial parts and the parts in the shape of evolvents may be in the same or in different matter, copper, iron, &c. All these windings always lead to two series of laminæ double in thickness or in layer. In practice we can arrive at constituting disks with only one layer or thickness of laminæ. We need, for instance, only give to the radial parts half the breadth which is generally allowed them. Fig. 41, Plate 10, is a schematic section by the mean cylinder developed like Fig. 9 in the case, in which this arrangement is applied to the first manner of classification by complete elementary zigzag we see that the two disks enter in a certain measure one into another for the radial parts, which are slightly displaced and occupy only half their width. It is evident that the surfaces of separation of the radial parts, instead of being normal to the plane of the disk, may be oblique. Fig. 42, Plate 10, represents for this case the section in schema by the mean cylinder developed like Fig. 9.

In all of the above explanations it has been supposed inductors were alike excited to an equal extent and symmetrically arranged. It must be understood, however, that these conditions are not at all essential and that they have been adopted only to facilitate the explanation. Likewise the number of poles is not material. Any number may be used. The kinds of winding which have just been described are also applicable to the case of a regular ordinary polygon winding, in which the number of the divisions is of the formula $np$. $n$ is the half number of the poles, and $p$ any number whatsoever. Let us suppose, for instance, the case of wires. Let us first take the first method of grouping by complete elementary zigzags. Let us suppose, to simplify matters, the case of the compound zigzag, Figs. 12 and 14, Plate 4. We have said that the winding in the shape of a compound zigzag is made up in reality of kinds of plates with raised edges regularly distributed on the circumferences of the odd and even disks united by joining-pieces set, as R$c$, Fig. 14, and alternately on the odd disk then on the even disk. It is evident that the number of these plates can be any one—for instance, a multiple of the half number of the poles on each disk. Then the plates will be symmetrically arranged round the axes of symmetry of the disks, and the symmetrical plates can be united either in tension or in quantity. This remark applies also to the case of the tracing of the formula $np \times 1$. These plates in succession will again be alternately on the odd disk and then on the even disk. Figs. 43 and 44 represent a winding of this kind in which the plates are united in quantity. In this case the joining-pieces, such as R $c$, Fig. 14, are useless and the junctions of plates are made at $s$ and at $t$, after having superposed the two disks. At $g$ we effect the bindings to the collector directly. An odd plate is represented, Fig. 45. Instead of leaving each of these kinds of plates entirely on one disk of the same parity, we can, by adopting the principle of grouping by fractions of elements, divide each of these plates into two parts formed each of half a zigzag and place all the analogous half zigzags on one same disk and the other analogous half zigzag on the other disk. Figs. 46, 47, 48, 49, 50, and 51 refer to this arrangement. The number of the divisions is twenty-four—i, e., $3 \times 8$. They correspond to the case of laminæ with evolvents turned down on the plane of the disk with a number of poles equal to six and the symmetrical elements united in quantity. The number of poles might be four, six, eight, or ten, it is evident.

Figure 46:
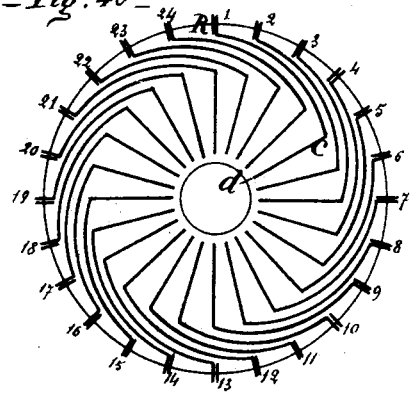
Figure 47:
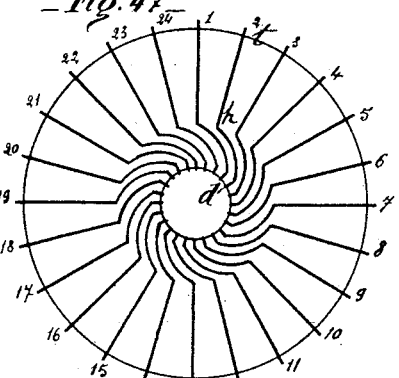

Figs. 46 and 47 refer to the case where the frames are formed of two evolvents and of two radial parts, of which half R$cd$ is on one plate and half $dht$ on the other. On each plate there are also elements formed of a radial part and of a part in the shape of an evolvent. It is a case analogous to that of Figs. 27 and 28, Plate 7, and 21 and 22, Plate 6.

Figure 48:
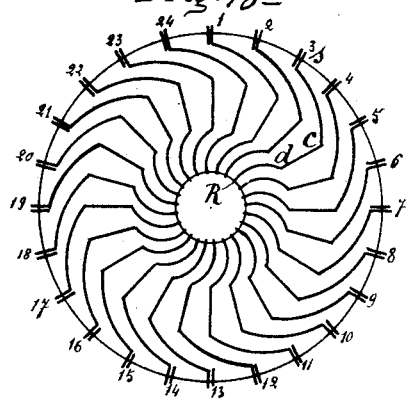
Figure 49:
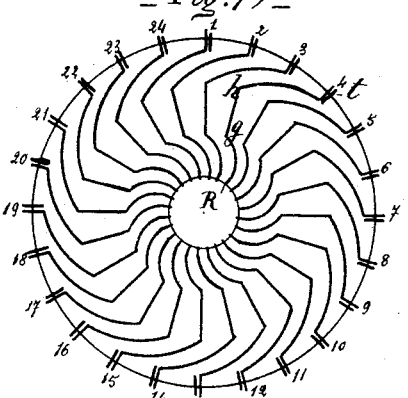

Figs. 48 and 49 refer to the case where the frames are formed of two radial parts and of two series of evolvents in opposite directions, taking the place of the former evolvents. (It is the case analogous to that of Figs. 30, 31, and 32, Plate 8.) On one of the plates, Fig. 48, there are thus elements formed of one part in the shape of an evolvent $sc$, of a radial part *cd*, and of a part in the shape of an evolvent *d* R. On the other plate, Fig. 49, we have in the same way elements such as R*ght*.

Figure 50:
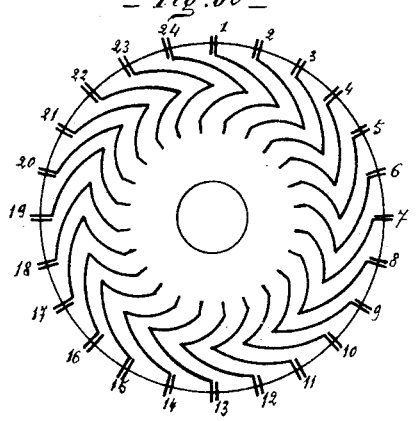
Figure 51:
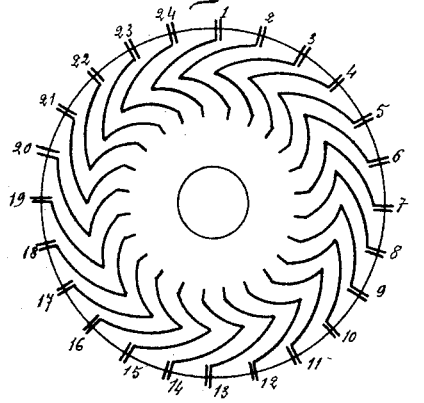
Figure 52:
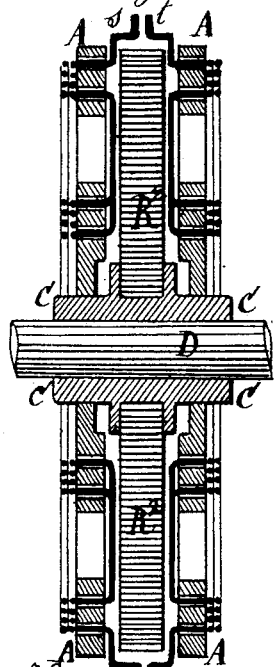

Figs. 50 and 51 are a particular case of Figs. 48 and 49. They refer to the case in which the radial parts, such as *cd* or *gh*, are broken in two parts formed of evolvents in a line with evolvents such as R*d* and *cs*, R*g* and *ht*. There are then on each plate only halves of frames formed of two evolvents in opposite directions.

The conductors employed for the windings above mentioned may be in magnetic matter. This may present some advantages. The conductors may also be formed half of magnetic matter and half of non-magnetic matter.

The different matters may be placed end to end or in juxtaposition, so as to form a compound conductor. We can also intercalate, Fig. 52, Plate 13, between the two plates A*c* and A′*c*′ of the armature some magnetic matter. For instance, this matter may be formed of laminæ wound in spirals R on the mandrel wedged on the shaft D, and constitute a kind of plate R on which the crowns A*c* and A′*c*′ are fixed. To improve the magnetic circuit, we may trace on this magnetic plate R radial grooves in such a way that the radial parts of the conductors of the armature may be inserted in the magnetic part. The magnetic matter thus forms in the free spaces between the radial conductors kinds of teeth. It is an arrangement analogous to that of the Paccinotti or Weston armature.

It is easy to imagine many other combinations. Thus the magnetic matter R, instead of being between the plates A*c* and A′*c*′, may be on one side only of the disk, forming a sort of crown destined to conduct the magnetic flux produced by the electros, which are then on the other side of the disk. It will be noticed that in the case of the first grouping in complete zigzags odd and even alternately on one side and then on the other side of this magnetic matter the conductors only pass above or below the magnetic matter of the armature without making complete turns. On the contrary, in the case of the second grouping in half elements alternately on one side and on the other side of this magnetic matter, the induced circuits are closed on this magnetic matter.

Figure 59:
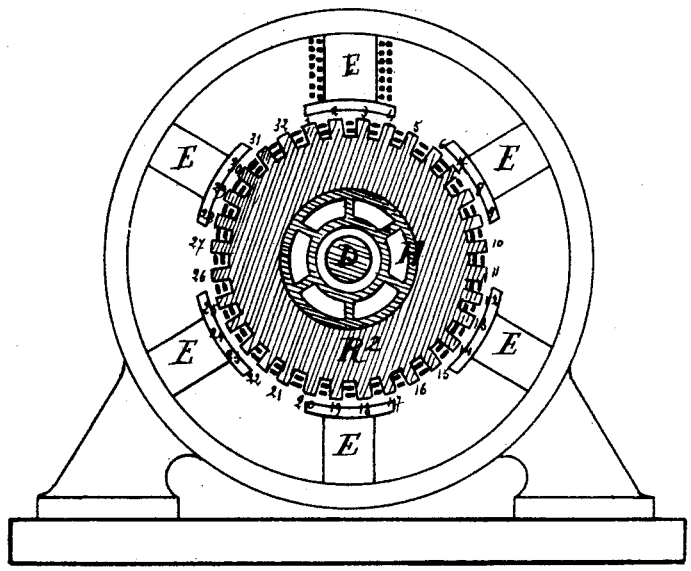
Figure 57:
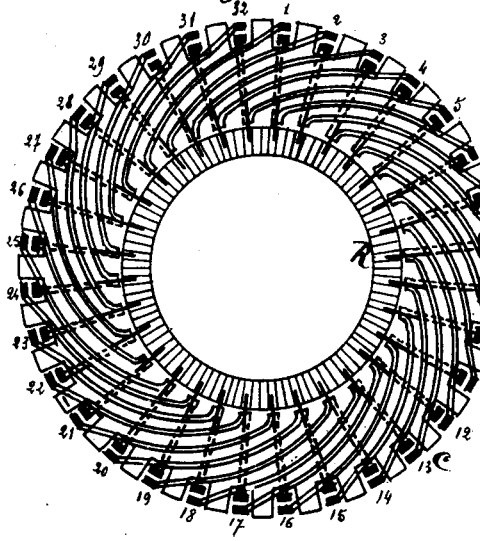
Figure 58:
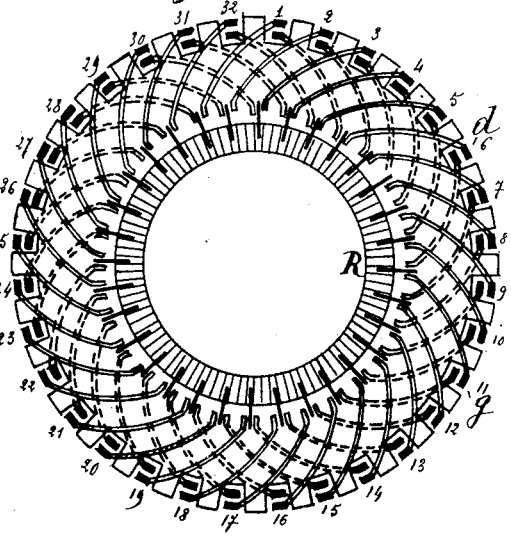
Figure 56:
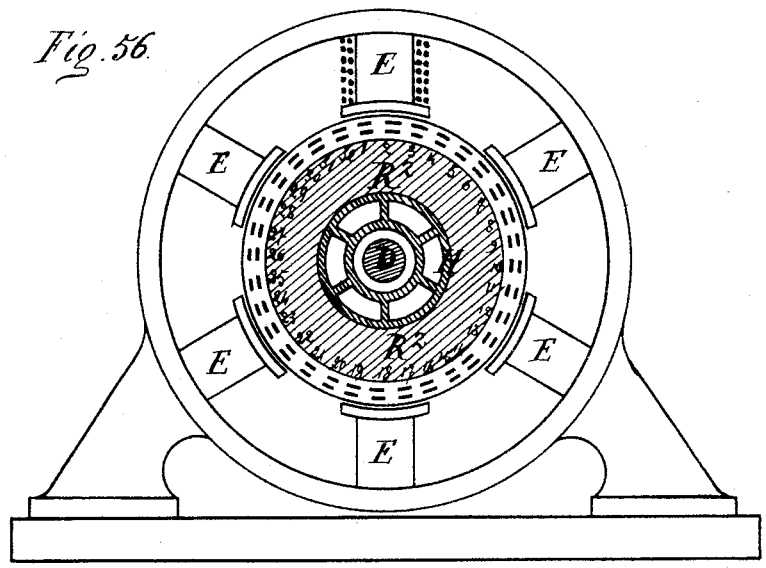
Figure 53:
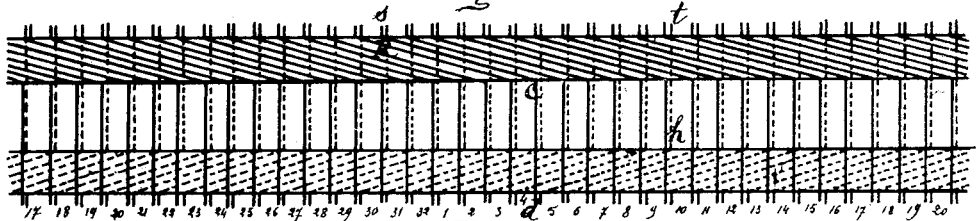
Figure 54:
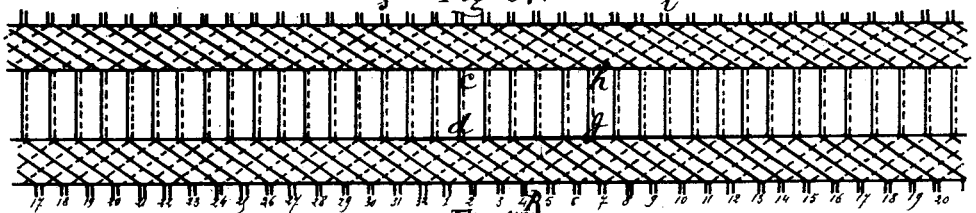
Figure 55:
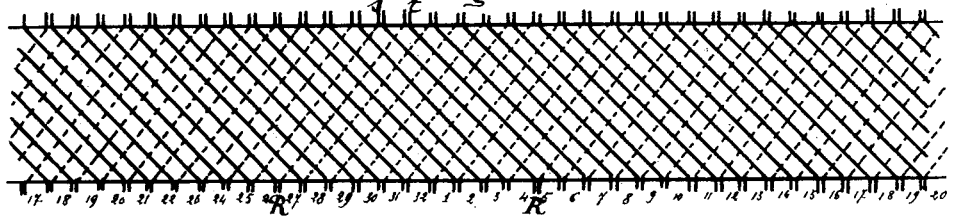

I will now describe the application of my improvements to armatures of the drum form. The form in the shape of a disk is not the only one which can be given to this kind of winding. The drum shape may be advantageous in some instances. Let us suppose that the center of a disk armature be displaced to infinity following the axis of the machine, keeping the radial parts of their original length and making them turn round points, such as *c* and *t*, Fig. 2, the radial parts will become generatrices of a cylinder and the parts in the shape of evolvents will become helices. If we develop the cylindrical tracings which correspond to the case of the laminæ and to the grouping in half elements we obtain Figs. 53, 54, and 55. These figures are directly derived from various figures of the present specification. Fig. 53 is derived from the tracing of Figs. 19, 20, 21, and 22, Plate 6. The parts marked with the same letters correspond. Fig. 54 is derived from the tracing of Figs. 30, 31, and 32, Plate 8. The parts marked with the same letters correspond. Fig. 55 is derived from the tracing of Figs. 34, 35, and 36, Plate 8. The parts marked with the same letters correspond. Fig. 56 represents the actual section made through the middle of the armature of a cylindrical machine of this kind perpendicularly to the shaft. E E are the electros; D, the shaft; H, the central boss and stock; $R^2$, the part which supports the winding. The conductors form two layers superposed. If we turn down the joining helices, such as *dh* or R*g* of Figs. 53 and 54 on the straight sections of the supporting-cylinder, the helices become involvents, as in ordinary machines. Figs. 57 and 58, Plate 13, refer to this case. Fig. 57 corresponds to the tracing of Fig. 53, and Fig. 58 corresponds to the tracing of Fig. 54. To effect the winding we need only in the two cases wind first the half elements, such as S*cd* or *scd* R, then the elements *dht* or R*ght*, or inversely. All these elements take their respective places quite naturally in juxtaposition and forming two cylindrical layers. The radial parts may of course form only one layer if we give to the radial parts only half their width and if we adopt the arrangements indicated in Figs. 41 and 42. The junction of the laminæ to each other, to the connector, and to the collector are made by the usual means. In these various cases it appears advantageous to constitute the supporting-drum in magnetic substance. Thus in Fig. 56 the coupling-box R′ is, in fact, constituted in magnetic matter fixed on the central boss H. In the case where laminæ of magnetic iron plate normal to the axis are employed with teeth, as in the Paccinotti machine, we obtain Figs. 56, 57, and 58. These figures explain themselves in accordance with the indications given in this specification. Fig. 59 is simply the reproduction of Fig. 56 with the indication of the teeth. These windings can also be applied to armatures for alternating currents. Whatever may be the winding, whether in the shape of a star-shaped polygon or in the shape of a regular polygon, I can divide all the winding into several parts formed of elements in succession one after another, the actions of which will not be synchronous, generally speaking, but will give alternating currents, which can be gathered by well-known means. It is, for instance, enough to unite the beginning of each of these parts to an insulated ring on the shaft, and the end of this same part to another insulated ring on the same shaft, in order to be able to collect the current by means of two brushes placed on the rings in the usual manner.

Having thus described my invention, I claim—

1. An armature composed of two coaxial parts similar in form, having their adjacent parts parallel one with the other, these two coaxial parts being armed with like elements arranged and classed symmetrically and formed of short conductors not cutting each other, the conductors of one part being placed side by side with those of the other part, these conductors having their extremities electrically connected, so as to form a continuous circuit, the extremities of each of the conductors or elements of one of the parts being, respectively, joined to the extremities of a preceding element and of a following element placed on the other of the two parts, so that the elements are connected in continuous series.

2. An armature formed of two half-armature disks placed in juxtaposition, each of the half-armature disks being constituted of three rings, one exterior, the second intermediate, the third interior, and armed on one of the surfaces common to the three rings by short conductors going from the exterior ring to the interior ring and placed one by the side of the other in groups occupying, in consequence, a certain width and putting in communication other conductors placed crownwise on the other surface common to the three rings, but only on the parts of this surface which belong to the exterior and interior rings, the whole formed by the groups of short conductors thus united forming similar elements symmetrically arranged and not cutting each other, leaving free on one side or face each intermediate ring, which can be removed after the winding of the elements, the extremities of each above-mentioned element of a disk being connected with the extremities of a preceding and following element placed on the other half-armature disk, so as to form continuous circuit, as hereinbefore described.

3. A disk armature formed of two half-disk armatures mounted on a single disk constituted of three rings, one exterior, the second intermediate, the third interior, each half-armature being formed of short conductors going from the exterior to the interior ring, arranged one by the side of the other in groups on one of the surfaces common to the three rings, the said groups belonging alternately to one half-armature and then to the other half-armature, the groups of the same parity—*i. e.*, of the same half-armature—occupying only a portion of the available width, the groups of the other parity—*i. e.*, of the other half-armature—occupying an analogous fraction of the available width, the short conductors which form these groups in juxtaposition putting in communication other conductors placed crownwise on the other surface common to the three rings, but only on the parts of this surface which belong to the exterior and interior rings, and the whole of each group of short conductors thus joined together forming similar elements symmetrically arranged and not cutting each other, leaving free on one side or face the intermediate ring, which can be taken away after the winding of the elements, the extremities of each above-mentioned element of the same parity—*i. e.*, of the same half-armature—being joined to the extremities of a preceding and following element of the other parity—*i. e.*, of the other half-armature—so as to form continuous circuit, as hereinbefore described.

In witness whereof I have hereunto signed my name in the presence of two subscribing witnesses.

EDMOND DESROZIERS.

Witnesses:
JULES FAYOLLET,
AUG. VINCK.